Feb. 2, 1954   W. R. DRAY   2,667,728
HEADER FOR HARVESTER COMBINES
Filed April 30, 1948   2 Sheets-Sheet 1
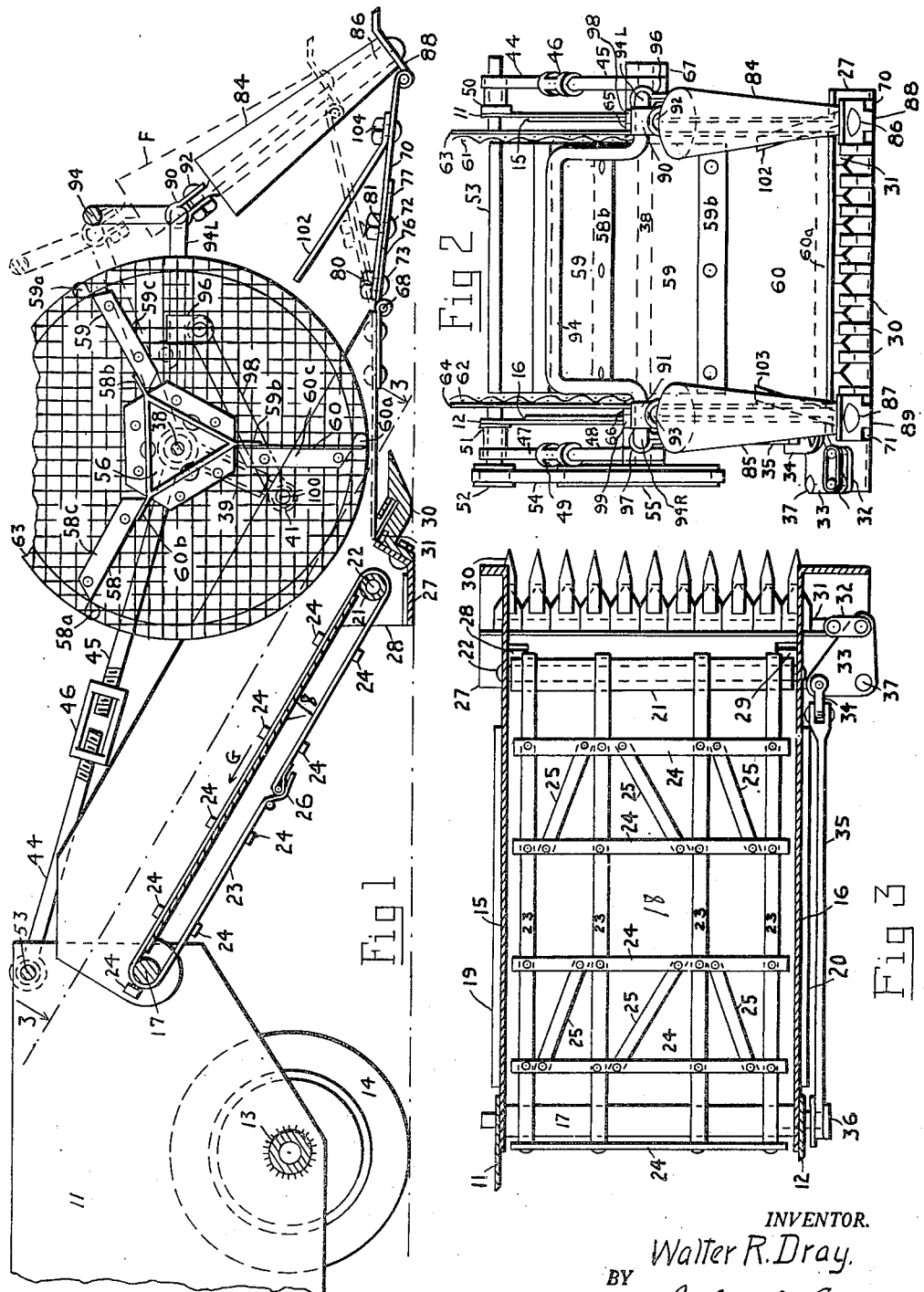
INVENTOR.
Walter R. Dray.
BY John D. Cox
Atty.

Feb. 2, 1954 — W. R. DRAY — 2,667,728
HEADER FOR HARVESTER COMBINES
Filed April 30, 1948 — 2 Sheets-Sheet 2
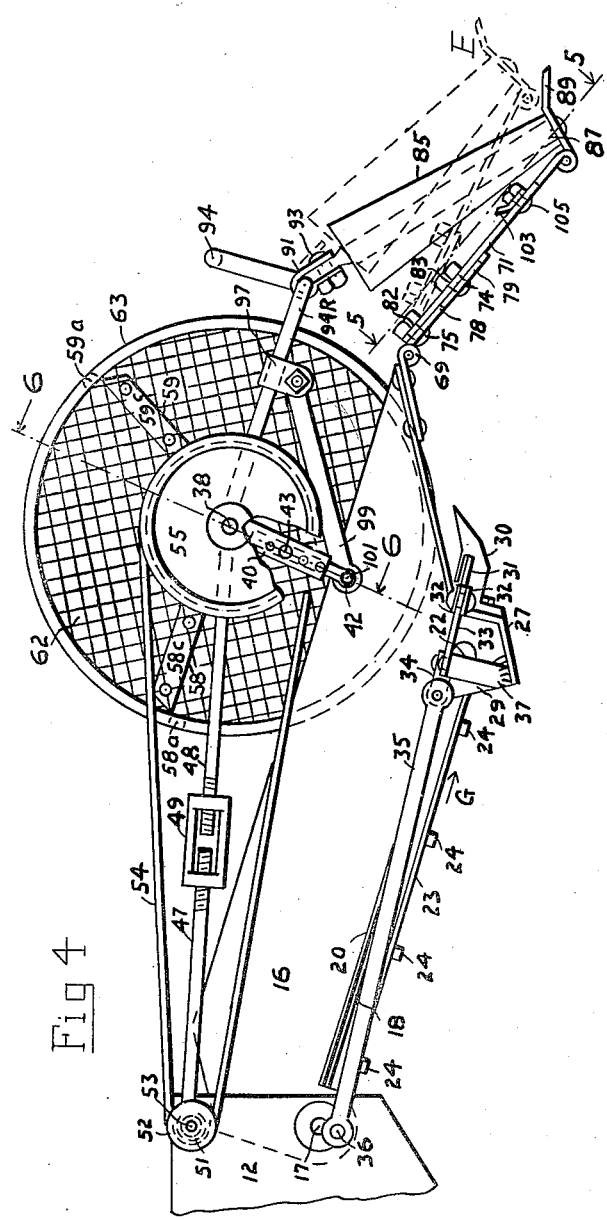
INVENTOR.
Walter R. Dray.
BY John D. Cox
atty Patented Feb. 2, 1954

2,667,728

UNITED STATES PATENT OFFICE 2,667,728

HEADER FOR HARVESTER COMBINES

Walter R. Dray, Yorkville, Ill.

Application April 30, 1948, Serial No. 24,172

9 Claims. (Cl. 56—181)

This invention relates to harvester combines, and more particularly to improvements in the header construction for combines and the like.

The principal object of the invention is to cut grain and other field crops, even though they may be tangled, weedy, and leaning badly, such as have long proved difficult to harvest, and convey them upward, away from the sickle, without bunching, wrapping, or throw-out losses.

Another object of the invention is the provision of new and improved divider mechanism for dividing the stalks or other crop material in advance of the reel before severing the same from the ground.

Another object of the invention is the provision of reel mechanism provided with new and improved means for preventing the severed crops from becoming entangled in the reel, or for preventing the crops from agglomerating into masses that cannot properly be conveyed to the threshing mechanism.

A still further object of the invention is the provision of new and improved adjustable mechanism for adjusting the distance between the dividers and for raising, lowering and adjusting the inclination and relation of the various parts.

A further object of the invention is the provision of new and improved adjustable divider extensions operating in advance of and cooperating with, the sickle and guard mechanism for severing the crop material close to the ground, if need be, for reducing the loss of grain to a minimum during the harvesting operation and with little or no likelihood of the guards or knives penetrating the ground.

A still further object of the invention is the use of inclined tapered divider rolls in connection with the divider mechanism for assisting in preventing agglomeration and tangling of the material and for insuring an efficient dividing of the same, even though the stalks be accompanied by weeds, vines and like vegetation.

Another object of the invention is the provision of a skeletonized or canvasless conveyer having novel means for maintaining the slats of the conveyer at right angles to the line of direction of movement of the conveyer.

A further object of the invention is the provision of reel, divider, and cutter mechanism that is simple in construction, efficient in operation, and that is comparatively inexpensive to manufacture.

Other and further objects and advantages of the invention will appear from the following description taken in connection with the accompanying drawings, in which:

Fig. 1 is a longitudinal sectional view of the front end of a harvester carrying what is known as a header, embodying this invention, with parts omitted for the sake of clearness and with the sickle and the dividers adjusted close to the ground, the dividers being shown dotted in raised position;

Fig. 2 is a front view of the header;

Fig. 3 is a top plan view of the header bottom as seen on the lines 3—3 of Fig. 1;

Fig. 4 is a right hand view of the header, shown lifted above the lowest cutting position, and the roller dividers in lower than normal position and with their forward ends adjusted to higher position, shown in dotted lines;

Fig. 5 is a top plan view of the lower right hand divider support, taken on line 5—5, of Fig. 4, showing the divider in normal position dotted, and in full lines as adjusted to the right and lengthened; and Fig. 6 is a front sectional view on line 6—6 of Fig. 4 showing the reel construction with parts omitted for the sake of clearness and parts broken away.

Heretofore, considerable difficulty has been experienced in harvesting weedy, viny or down and tangled crops and it was thought that the trouble rested largely with the reel which is relied upon to sweep the cut crop in, back and upward over the sickle and onto the conveyer. It has not been so much that the reel would not do this, but that it caused so much trouble in so doing, especially if the reel be kept down close enough to save all the crop material.

To achieve the desired result of being able to cut cleanly and continuously in tough fields, under all conditions, it was found necessary to make cooperating improvements not only in the reel, but in the dividers, the sickle, and the conveyer as well, and this has been done by the present invention.

The dividers of the new improved header will divide the crop before the cut stalks are swept into the header, without clogging the dividers, while the reel which does the sweeping may be positioned close enough to the sickle to move the cut stalks continuously onto a draper or conveyer, which in turn is aggressive enough to take the crop on upward in a smooth, continuous flow, without throwing out of stalks, or wrapping the same around the reel shaft ends. Cooperating with these elements are a sickle and guards that cut the crop loose from the ground more cleanly, as the reel sweeps it in, as will presently appear.

While most harvesters require elevation of the cut crop to the processing means in the harvester, there are some cases where there is no need to elevate the crop with an endless slatted conveyer. In such machines the novel dividing, cutting and sweeping in cooperation of the reel, dividers and sickle may be used without the elevating endless slatted conveyer.

Referring now to the drawings, the side members of a harvester are shown at 11 and 12, with an axle 13 and the left wheel 14. To these side members the side walls 15 and 16 of the header are pivotally attached and are adjustable around the axis of the upper conveyor roller 17. The header bottom 18, Figs. 1 and 3, is attached to the lower flanges 19 and 20 of the header sides. The lower conveyor roller 21 revolves idly on its stationary shaft 22 attached to the header sides.

Over these two rollers runs the "canvasless" or skeletonized draper or conveyer, consisting of the longitudinally extending straps or belts 23, spaced apart, and to which are riveted the transversely extending conveying slats 24, also spaced apart thereon. Diagonal belts or straps 25 extending between certain of the adjacent slats keep these slats square across the line or direction of travel of the draper, as shown by the arrows G, Figs. 1 and 3. The upper roller 17 does the driving of the draper through frictional contact with the longitudinal and diagonal belts, as tightened by the buckles 26. The shaft of roller 17 is driven in the usual manner by the mechanism of the harvester.

Suitable means are provided at the lower end of the conveyer for cutting or severing the crop material, as the harvester combine is propelled through the field of grain or other crop material. As shown in Figs. 1 and 2, a reciprocating sickle, together with mounting and operating mechanism for the same, is provided for this purpose. The sickle has its knives or sections inclined downwardly and forwardly and protected by guards having their points inclined upwardly and forwardly whereby the crop material may be severed or cut close to the ground for harvesting tangled and fallen stalks or other material as will now be described.

The sickle foundation angle or cutter bar 27, which supports the sickle, is in the form of an angle bar, Figs. 1 and 4, and is attached to ears 28 and 29 at the lower front ends of the header sides 15 and 16. To this foundation angle are attached the sickle guards 30, each of which is somewhat in the form of a recumbent letter Z with its rear portion extending rearwardly and downwardly and rigidly secured to the upstanding flange of the angle bar 27 and with its pointed or forward end portion extending upwardly and forwardly and its intermediate portion extending downwardly and forwardly and provided with a slot also extending downwardly and forwardly for receiving the sickle. The sickle knives or sections being held at an angle to the ground can more easily cut vegetation, especially if large weeds are encountered, because large stalks and weeds are more easily cut on the bias than at right angles to their length. The upturned guard points prevent the guards from digging in the ground and the downturned knives insure closer and cleaner cutting, especially in fields where the crops are down and tangled. It may be stated at this point that the plane of the upper surfaces of the forward portions of the guards is substantially parallel with the horizonal flange of the angle member 27 and is parallel with the ground when the header is in lowered position as shown in Fig. 1, so that the upward inclination of the guard is practically all from the under sides of the guard points, whereby there is little likelihood of the guards ever digging in the ground and at the same time these guards slip easily under green or sticky vegetation.

The sickle 31 is driven from its right end by the double link 32, Figs. 3 and 4, which in turn is pivotally attached to the forward corner of a bell crank 33, Fig. 3. A connecting link 34 connects the bell crank to the lower end of the pitman 35. This pitman is driven by the crank pin 36 on the right hand end of the upper draper roller 17, as shown in Fig. 4. The bell crank 33 is pivotally attached to the post 37 welded to the sickle foundation angle 27.

A reel is provided which is adjustably supported from the ends of the reel shaft 38 above the sickle by telescopic arm supports the upper tubular arms 39 and 40 of which are provided with hubs that are pivoted on the outer end portions of the reel shaft 38 outwardly of spacers 65 and 66 and held by cap 67, as shown in Fig. 6, and the lower support arms 41 and 42 of which have their lower ends pivoted to pins or studs 100 and 101 fixed to the side walls 15 and 16 of the header. These telescopic supports are held in adjusted telescopic position by pins 43 and 43a that engage registered openings in these telescopic parts. The reel supporting arms being adjustable in length permit vertical adjustments of the reel and being pivoted at their ends assist in causing the reel to automatically move forwardly of the sickle when the forward end of the header is elevated due to the eccentricity of the pivots 17 and 51, Fig. 4.

The position of the reel shaft 38 longitudinally of the header is determined by the length of the adjustable link 47—48 with its turnbuckle 49, and the link 44—45 with its turnbuckle 46, Figs. 1 and 4. These links are pivotally mounted at their forward ends on the hubs of the tubular arms 39, 40, and at their rear ends to the harvester sides 11 and 12 on the pivot pins 50 and 51, Figs. 1 and 6. The sheave 52, on the right end of the shaft 53 drives the V-belt 54, which in turn drives the reel through the flat bottom grooved reel sheave 55. Adjustment of the turnbuckle 49 determines the tightness of the belt, and its grip on the flat bottom of the groove in the sheave 55, thus acting as a safety drive to protect the reel. The turnbuckle 46 adjusts the length of the left hand link 44—45, so as to keep the reel shaft 38 square with the header.

The reel is provided with any suitable number of bat members and these bat members may be of any appropriate material. In order to provide minimum weight and maximum strength, the bat members are preferably, though not necessarily, of sheet metal material and three in number.

The reel comprises the shaft 38 adjacent the ends of which are welded or otherwise rigidly attached flanged triangular gusset plates 56 and 57, to the flanges of which the bats or bat members 58, 59 and 60 are attached as by riveting or otherwise, as shown in Fig. 6 and as now will be described. Each bat member, say the bat member 58, is formed from a single sheet or strip of sheet metal into three integral sections bent to occupy three different planes. The outer section 58 of the sheet constitutes the bat member proper and is flanged at its side edges as at 58c, to which the end walls of the reel are to be attached as by rivets, as will presently be described. These flanges stop short of the outer end of the sheet and this free outer end of the sheet is bent reversely to form a roll 58a extending from end to end of the reel for battling the crop material onto the conveyer. The intermediate portion of this sheet, which has a continuation of the flange 58c, is bent to extend along one of the flanges of the gusset plate at each end of the reel and is riveted or otherwise rigidly secured thereto. A V-shaped portion of the flange 58c was removed to facilitate the bending of the sheet to conform to the flange of the triangular gusset plate, so that the bat members may extend from the corners of the triangular gusset plates radially outward relative to the shaft 38. The inner section of the sheet has its flange removed and is riveted to the next adjacent bat member 59. The remaining bat members 59 and 60 are similarly arranged and need not be described.

It will thus be seen that the intermediate sections of these bat member sheets when assembled form a closed housing for the axle 38 between the gusset plates, thereby preventing crop material from catching or lodging on the reel shaft or winding around the same during the operation of the combine. It will also be appreciated that such a construction is very strong, light in weight and efficient in operation.

In order to prevent crop material from becoming lodged between the bat ends and the header walls or entering or leaving the reel from the ends or becoming tangled or lodged in the reel, provision is made for insuring against such contingency by providing end walls 61 and 62 for the reel. These walls are circular and conform to the reel ends. Extending about and secured to their peripheries are circular steel rims 63 for reinforcing these walls. Any suitable material may be employed for the end walls. Preferably, they are transparent or perforated and in the form selected to illustrate one embodiment of the invention the end walls are of reticulated material whereby they will prevent lateral movement of the crop material to or from the reel end without interfering with the line of vision of the operator watching the combine from the driver's seat. These reel end walls are rigidly secured to the flanges 58c, 59c and 60c of bat members 58, 59 and 60.

The conventional harvester or harvester combine functions satisfactorily under ideal conditions as when the ground is smooth, the crop material straight and of uniform height, and with no weeds or vines, but great difficulty is encountered if the crop material is weedy, viny, or tangled and blown down, whether or not the difficulties be aggravated by rough or uneven ground. It has been learned by a long series of experiments that the proper method of procedure is to divide the uncut crop material well in advance of the reel and to deliver the same between the reel ends, whereby a steady flow of material is insured past the reel and onto the conveyer. This is considered an important feature of the invention. One form of divider extension embodying this invention and shown on the drawing will now be described.

The divider extension comprises the dividers 84 and 85, one at each side of the header, and upper and lower supporting means for said dividers that adjustably support the same, so that they extend downwardly and forwardly for dividing the crop material in advance of the reel. Preferably, though not necessarily, the dividers 84 and 85 are in the form of conical rollers freely rotatable on their shafts 86 and 87 and with their larger ends turned upward for deflecting the contacting crop material within the reel ends as shown in Fig. 2.

The lower supporting means for the dividers 84 and 85, Figs. 1, 4 and 5, comprise supporting plates 70 and 71 connected by hinges 68 and 69 to the lower tapered forward ends of the side walls 15 and 16 of the header and hingedly connected at their forward ends to hinged plates 88 and 89, to which the lower ends of the roller shafts 86 and 87 are connected.

The plate supports 70 and 71 are adjustable both longitudinally of, and transversely to, the header by bolt and slot connections with the hinges 68 and 69. As shown in Figs. 1, 4 and 5, bolts 72, 73, and 74, 75 do the attaching by extending through longitudinally extending slotted holes 76, 77 and 78, 79 in the hinges, and through the round holes 80, 82 and the transversely arranged slotted holes 81, 83 in the divider supports 70 and 71. As shown in Fig. 5, the effective longitudinal and side positions of the lower ends of the roller dividers 84, 85 may be adjusted by changing the position of the bolts 72, 73, 74 and 75 in said holes and slots.

The means for supporting the upper ends of the dividers 84 and 85 comprise clips 90 and 91 between the upper ends of the roller shafts 86 and 87 and a U-shaped bar member 94 arched upwardly at its central portion and having its arms 94L and 94R extending rearwardly and pivoted on the hubs of the tubular arms 39 and 40, Fig. 6.

The upper ends of the roller shafts 86 and 87 are pivoted to the bolts 92 and 93 thereby permitting lateral movements of the lower ends of said shafts when the bolts are loosened. The bar member 94 is held rigidly in adjusted position by brace members 98 and 99 pivoted at their lower ends on the fixed pins or studs 100 and 101. The up and down adjustment of the two sides of this upper divider support 94 may be made by moving the clips 96 and 97 lengthwise of the side arms 94L and 94R.

The divider support 94 spaces the upper ends of the divider rollers apart and its central portion is offset upwardly to provide clearance for tall crops. The arms 94L and 94R of the support 94 also assist in directing the crop material in between the end walls of the reel.

Both roller dividers may be independently adjusted as to both vertical and horizontal inclinations to meet various crop conditions. The bolts 72, 73, 74 and 75 and cooperating slots and openings permit the lateral adjusted inclinations of the lower ends of the dividers 85 and 86 and the clips 96 and 97, together with lengthening or shortening of the supports 70 and 71, permit adjusted vertical inclinations of the dividers 85 and 86, as shown in full lines and in the dotted lines at F and E in Figs. 1 and 4, respectively.

The rolling action of the dividers 84 and 85, automatically caused by crop material dragging so as to rotate the rollers one way or the other, keeps rolling off the viny stalks that start to gather, thereby keeping the dividers clean. The inverted tapered rollers also function as guides for diverting the crop material laterally inwardly between the end walls of the reel.

Crop diverters comprising the resilient rods 102 and 103 are bolted to the lower divider supports 70 and 71 by the bolts 104 and 105 and may be adjusted sideways or longitudinally relative to the lower divider supports. These diverters assist in diverting shorter crop material not tall enough to reach the upper ends of the rollers laterally into the reel between the reel ends, while the taller material is diverted into the reel between the reel end walls by the divider extensions and by the arms 94R and 94L of the divider support 94.

It is thought from the foregoing specification, taken in connection with the accompanying drawings, that the disclosure of my invention will be apparent to those skilled in the art, and that changes in the size, shape, proportions and details of the various parts may be made without departing from the spirit and scope of the appended claims.

I claim as my invention:

1. In a harvester combine having side members, a conveyer roller shaft journaled in said side members, a header pivotally adjustable about the shaft of said roller, side walls for said header, pins mounted on the forward end portions of said sidewalls, a reel, means for supporting said reel on said header for vertical and longitudinal adjustment, said means comprising adjustable supporting arms pivotally connected to said pins and rotatably supporting said reel, a U-shaped divider support having rearwardly extending arms pivoted on the axis of said reel, brace links pivotally mounted on said pins, and extending diagonally upwardly and forwardly to said arms, clips pivoted to the upper ends of said links and adjustably clamped to the arms of said divider support, dividers, and means including said divider support for supporting said dividers in advance of said reel.

2. In a harvester combine having side members, a header pivoted at its rear end to said side members, said header having side walls provided with fixed pins adjacent their lower ends, a reel, a shaft therefor, arm supports pivoted to said pins, and rotatably supporting said shaft, a power shaft journaled in said members, a pulley with a V-groove mounted on said power shaft, a sheave on said reel shaft, said sheave having a V-groove in its periphery, the V-groove having a flat bottom surface, a truncated V-belt engaging said grooves and adapted to frictionally engage said bottom surface, links having turnbuckles therein pivotally mounted on said shafts for adjustably tensioning said belt whereby said belt may be so tensioned as to slip for protecting said reel when resistance to rotation rises above its predetermined amount and freely rotating dividers forwardly of said reel for directing crop material to said reel.

3. In a header for a crop harvester mechanism, a sickle inclining downwardly and forwardly at the lower front end of said header, a reel, arms projecting upwardly from the header and supporting the reel above the sickle, a pair of dividers, means connected to said arms supporting said dividers materially in advance of said reel, circular reticulated end walls for said reel, and means including said dividers for directing uncut crop material into said reel between said end walls preparatory to batting the crop material rearwardly and severing the same by said sickle.

4. In a header for a harvester mechanism, a sickle, a reel above said sickle and extending parallel therewith, a pair of spaced rotatable dividers, means supporting said dividers a material distance in advance of said reel, said means including upper and lower supports for said dividers, said lower supports comprising a pair of adjustable spaced supporting bars pivoted at their rear ends to the forward ends of said header at each side of the latter and pivoted at their forward ends to the lower forward ends of said dividers, and means for adjusting the forward portions of said dividers laterally toward and from each other.

5. In a combine harvester, a header mechanism comprising side and bottom walls, a cutter bar at the lower forward end of said bottom wall, a sickle operatively connected to said cutter bar, means for reciprocating said sickle, a reel, means for rotatably and adjustably mounting said reel on said side walls above said sickle, a divider mechanism operatively connected by hinge means to said side walls at the front ends thereof in advance of said reel, said mechanism comprising rollers tapering inwardly toward the bottom and extending downwardly and forwardly and spaced apart substantially the distance of the length of said cutter bar, and means for adjusting the distance between the lower ends of said tapered rollers and for raising and lowering said rollers.

6. In a combine harvester, a header having side and bottom walls extending downwardly and forwardly, a cutter bar extending transversely of the header at the lower end of said bottom wall, a sickle operatively connected to said cutter bar, means for reciprocating said sickle, an elevator for carrying severed material upwardly along said bottom wall into said harvester, a reel having its axis parallel with said sickle, above and slightly in advance of the same, adjustable divider mechanism in advance of said reel, said mechanism comprising a roller mounted forwardly of each end of said reel, each roller being tapered inwardly toward the bottom and extending downwardly and forwardly, and an adjustable support for each of said rollers supporting said rollers spaced apart a distance slightly greater than that of the length of said reel with the lower ends of said rollers in advance of the lower ends of said side walls for guiding unsevered crop material inwardly between the ends of said reel and sickle and for delivering severed material rearwardly onto said elevator.

7. In a harvester combine, a header having side and bottom walls extending downwardly and forwardly, a cutter bar at the lower forward end of said bottom wall, said bar having sickle guards provided with a sickle-way opening rearwardly substantially in the plane of said bottom wall, a sickle mounted in said way, means for reciprocating said sickle, a reel above and parallel with said cutter bar, means for adjustably and rotatably supporting said reel from said side walls, divider extension mechanism mounted forwardly of said reel and sickle, said mechanism comprising a pair of rollers tapering inwardly toward the bottom, extending downwardly and forwardly and spaced apart substantially the distance between the ends of the cutter bar, supports for adjustably supporting the upper ends of said rollers from said reel, and means for raising and lowering said rollers and for adjusting the lower ends of said rollers laterally toward and from each other.

8. In a harvester combine having side members, a conveyor roller shaft journaled in said side members, a header pivotally adjustable about the shaft of said roller, side and bottom walls for said header, pins mounted on the forward end portions of said side walls, a reel, means for supporting said reel or said header for vertical and longitudinal adjustment, said means comprising extensible supporting arms pivotally mounted on said pins and rotatably supporting said reel, a longitudinally adjustable brace rod at each side of said header having their rear ends journaled on a shaft above the shaft of said roller and at their forward ends being journaled on the axis of said reel for positioning said reel, means for driving said reel from said roller, an upper U-shaped divider support having rearwardly extending arms pivoted on the axis of said reel, the forward central portion of said divider support being offset upwardly, brace links pivotally mounted on said pins and extending diagonally upwardly and forwardly to said arms, clips pivoted to the upper ends of said links and adjustably clamped to the arms of said U-shaped divider support, dividers comprising a pair of rollers spaced apart, tapering inwardly toward the bottom and extending downwardly and forwardly, means for pivotally connecting the upper ends of said rollers to said divider support, adjustable means having their rear ends pivoted to the forward ends of said side walls and their forward ends pivotally connected to the forward ends of said divider rollers, and crop diverting rods secured at their forward ends to said last named means for diverting crop material to said reel.

9. In a harvester combine a header having a bottom wall and side walls extending downwardly and forwardly, a cutter bar at the lower end of said bottom wall, an elevator extending upwardly and rearwardly from said cutter bar, said cutter bar having guards attached thereto provided with a sickle-way opening rearwardly and upwardly parallel with said elevator, a sickle mounted in said way, means for reciprocating said sickle, a reel, means for rotating said reel on an axis parallel with and above said sickle, said guards having their forward ends pointed and extending upwardly and forwardly for preventing digging in the ground, and a divider mechanism including a pair of rollers extending forwardly and downwardly from points substantially directly in front of the ends of said reel, each of said rollers being tapered inwardly toward the bottom, and means for elevating said sickle and simultaneously lowering the forward ends of said rollers.

WALTER R. DRAY.

References Cited in the file of this patent

UNITED STATES PATENTS

| Number | Name | Date |
|---|---|---|
| 407,387 | Womack | July 23, 1889 |
| 447,245 | Inglis | Feb. 24, 1891 |
| 640,044 | Stewart | Dec. 26, 1899 |
| 723,393 | Kenny | Mar. 24, 1903 |
| 809,216 | Pearce | Jan. 2, 1906 |
| 1,565,189 | Morgan | Dec. 8, 1925 |
| 1,587,862 | Rutishauser et al. | June 8, 1926 |
| 1,723,357 | Koopman | Aug. 6, 1929 |
| 1,779,233 | Harms | Oct. 21, 1930 |
| 1,881,411 | Love et al. | Oct. 4, 1932 |
| 1,888,210 | Moir | Nov. 22, 1932 |
| 2,025,497 | Crumb | Dec. 24, 1935 |
| 2,044,396 | Perau | June 16, 1936 |
| 2,064,480 | Lock et al. | Dec. 15, 1936 |
| 2,099,471 | Edgington | Nov. 16, 1937 |
| 2,226,563 | Keith | Dec. 31, 1940 |
| 2,301,873 | Heth et al. | Nov. 10, 1942 |
| 2,352,506 | Zirckel | June 27, 1944 |
| 2,405,530 | Sullivan | Aug. 6, 1946 |
| 2,465,709 | Cieslak | Mar. 29, 1949 |
| 2,499,998 | Krause et al. | Mar. 7, 1950 |